United States Patent
Carey (10) Patent No.: US 10,452,596 B2
(45) Date of Patent: Oct. 22, 2019

(54) MEMORY CELLS CONFIGURED IN MULTIPLE CONFIGURATION MODES

(71) Applicant: Micron Technology, Inc., Boise, ID (US)

(72) Inventor: George F Carey, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 14/927,061

(22) Filed: Oct. 29, 2015

(65) Prior Publication Data
US 2017/0123707 A1 May 4, 2017

(51) Int. Cl.
| G06F 11/14 | (2006.01) |
| G06F 12/08 | (2016.01) |
| G06F 12/0808 | (2016.01) |
| G06F 12/0815 | (2016.01) |
| G06F 13/42 | (2006.01) |
| G06F 13/40 | (2006.01) |

(52) U.S. Cl.
CPC ...... *G06F 13/4282* (2013.01); *G06F 13/4068* (2013.01)

(58) Field of Classification Search
CPC .......................................................... G06F 3/06
USPC .......................................................... 711/102
See application file for complete search history.

(56) References Cited

U.S. PATENT DOCUMENTS

| 8,446,792 B2* | 5/2013 | Fukushima ........ G01R 31/2874 365/154 |
| 8,533,384 B2* | 9/2013 | Olbrich ............... G06F 13/1657 711/103 |
| 8,886,877 B1* | 11/2014 | Avila .................... G06F 3/0679 711/103 |
| 9,003,109 B1* | 4/2015 | Lam ...................... G06F 3/0688 711/103 |
| 9,442,843 B2* | 9/2016 | Nakashita ........... G06F 12/0246 |
| 2007/0216376 A1* | 9/2007 | Ogawa .................... G01K 3/005 323/236 |
| 2007/0274147 A1* | 11/2007 | Egerer ................... G11C 11/406 365/222 |
| 2010/0082890 A1* | 4/2010 | Heo ..................... G06F 12/0246 711/103 |
| 2010/0262721 A1* | 10/2010 | Asnaashari ........... G06F 13/161 710/5 |
| 2011/0167208 A1* | 7/2011 | So ........................ G06F 12/0246 711/103 |
| 2013/0173874 A1* | 7/2013 | Sprouse ............... G06F 12/0246 711/157 |

(Continued)

*Primary Examiner* — Mohamed M Gebril
(74) *Attorney, Agent, or Firm* — Schwegman Lundberg & Woessner, P.A.

(57) ABSTRACT

Some embodiments include apparatuses and methods having an interface to communicate with a host, memory cells, and a control unit coupled to the interface to associate a portion of the memory cells with a logical address range based on control information provided to the interface from the host. The control unit is configured to cause the portion of the memory cells to operate in a configuration mode indicated by the control information from the host. Each memory cell in the portion of the memory cells is operable to store at most one bit of information if the configuration mode is a first configuration mode and to store more than one bit of information if the configuration mode is a second configuration mode.

28 Claims, 3 Drawing Sheets

(56) References Cited

U.S. PATENT DOCUMENTS

| | | | |
|---|---|---|---|
| 2014/0244903 A1* | 8/2014 | Yano | G06F 12/0246 |
| | | | 711/103 |
| 2014/0359242 A1* | 12/2014 | Son | G06F 13/1689 |
| | | | 711/167 |
| 2015/0006663 A1* | 1/2015 | Huang | G06F 13/4221 |
| | | | 709/213 |
| 2015/0143026 A1* | 5/2015 | Reddy | G06F 3/0616 |
| | | | 711/103 |
| 2015/0262714 A1* | 9/2015 | Tuers | G11C 29/50004 |
| | | | 714/721 |
| 2015/0301932 A1* | 10/2015 | Oh | G06F 11/00 |
| | | | 711/102 |
| 2016/0066266 A1* | 3/2016 | Law | H04W 52/027 |
| | | | 455/574 |
| 2016/0077968 A1* | 3/2016 | Sela | G06F 12/0246 |
| | | | 711/118 |
| 2016/0170871 A1* | 6/2016 | Hyun | G06F 3/0679 |
| | | | 711/103 |
| 2016/0313943 A1* | 10/2016 | Hashimoto | G06F 16/00 |
| 2016/0342463 A1* | 11/2016 | Oshima | G06F 11/1004 |
| 2017/0071056 A1* | 3/2017 | Stoev | H05K 1/0212 |
| 2017/0249091 A1* | 8/2017 | Hodes | G06F 3/0611 |
| 2018/0067678 A1* | 3/2018 | Jeong | G06F 3/0616 |

* cited by examiner

MEMORY CELLS CONFIGURED IN MULTIPLE CONFIGURATION MODES

BACKGROUND

Many electronic systems, such as desktop and laptop computers, servers, and other electronic devices or systems, usually have a memory device to store information (e.g., data). Some memory devices have memory cells (e.g., multi-level cells) where each of the memory cells can store multiple bits of information. Some conventional memory devices have a capability to be configured to operate in only one configuration mode at a time. For example, at one time, the memory device may be configured in one configuration mode, such that each of the memory cells of the memory device may store only one bit of information. Then, at another time, the memory device may be configured in another configuration mode, such that each of the memory cells of the memory device may store more than one bit of information. The single configuration mode may cause some conventional memory devices to be unsuitable for some usage environments.

DETAILED DESCRIPTION

Figure 1:
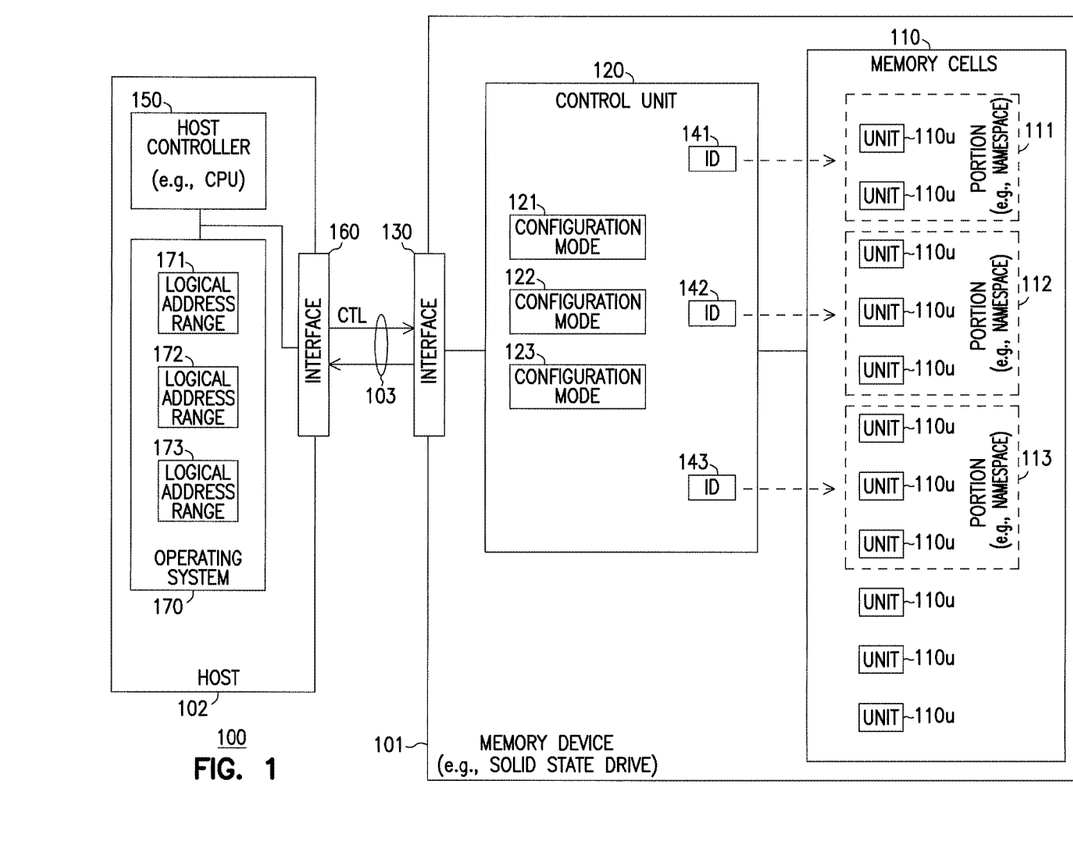
FIG. 1 is a block diagram of an apparatus including a memory device, a host, and a connection, according to some embodiments described herein.

FIG. 1 is a block diagram of an apparatus 100 including a memory device 101, a host 102, and a connection 103, according to some embodiments described herein. Apparatus 100 can include or be included in a computer, a memory storage system, or other types of electronic systems.

Memory device 101 can include memory cells 110, a control unit 120, and an interface 130. Memory cells 110 can be included in (e.g., formed in or formed on) a single die or multiple dice. The die can be included in a chip (e.g., a semiconductor chip). Memory cells 110 can include non-volatile memory cells. Examples of non-volatile memory cells include flash memory cells or other types of non-volatile memory cells. Memory cells 110 can be arranged in a NAND-type memory arrangement. Control unit 120 can be included in a die separated from the die (or dice) where memory cells 110 are included. Memory device 101 can include a solid state drive (SSD). Thus, memory cells 110, control unit 120, and interface 130 can be part of an SSD.

Each memory cell in memory cells 110 can be configured to store multiple bits of information (e.g., multiple bits of data). For example, each of memory cells 110 can be configured as a multi-level cell (MLC) to store at most two bits (up to two bits) of information, a triple-level cell (TLC) to store at most three bits (up to three bits) of information, or another cell configuration to store more than three bits of information.

Although each of memory cells 110 can be configured to store multiple bits information, at least a portion of memory cells 110 or all of memory cells 110 can also be configured as a single-level cell (SLC) to store at most one (e.g., only one) bit of information.

Thus, in memory device 101, at least a portion of memory cells 110 can be configured (e.g., set) such that each memory cell in that portion can operate as an SLC, MLC, TLC, or another cell configuration to store more than three bits of information.

One of ordinary skill in the art may recognize that a memory device (e.g., an SSD) such as memory device 101 may include other elements, several of which are not shown in FIG. 1, so as not to obscure the example embodiments described herein.

FIG. 1 shows an example of three portions 111, 112, and 113 of memory cells 110. The number of portions of memory cells 110 may vary. Each of portions 111, 112, and 113 can include one or more memory cell units 110$u$. Each of memory cell units 110$u$ can include a number of memory cells. The numbers of memory cell units 110$u$ in portions 111, 112, and 113 can be the same or can be different. Control unit 120 may create portions 111, 112, and 113 based on information provided by host 102. Such information may include different logical address ranges. The number of portions 111, 112, and 113 may be based on the number of the logical address ranges. Control unit 120 may associate portions 111, 112, and 113 with the logical address ranges.

Control unit 120 can cause (e.g., set) different portions of memory cells 110 to operate in different configuration modes. FIG. 1 shows an example of configuration modes 121, 122, and 123 in control unit 120. If a particular portion of memory cells 110 is set to operate in configuration mode 121 (e.g., SLC mode), then each memory cell in that particular portion can be operable to store at most one bit of information. If a particular portion of memory cells 110 is set to operate in configuration mode 122 (e.g., MLC mode), then each memory cell in that particular portion can be operable to store at most two bits of information. If a particular portion of memory cells 110 is set to operate in configuration mode 123 (e.g., TLC mode), then each memory cell in that particular portion can be operable to store at most three bits of information.

As an example, control unit 120 can cause portions 111, 112, and 113 to operate in configuration modes 121, 122, and 123, respectively. Thus, in this example, each memory cell in portion 111 can be operable (e.g., can be configured as an SLC) to store at most one bit of information. Each memory cell in portion 112 can be operable (e.g., can be configured as an MLC) to store at most two bits of information. Each memory cell in portion 113 can be operable (e.g., can be configured as a TLC) to store at most three bits of information. Thus, memory device 101 can have different portions (e.g., 111, 112, and 113) of memory cells that can be concurrently configured (e.g., configured in the same process or configured at the same time) to operate in different configuration modes (e.g., a combination of SLC, MLC, and TLC modes).

Thus, in memory device 101, depending on which configuration mode is set for a particular portion of memory cells 110, each memory cell in that particular portion can be operable to store at most one bit of information or more than one bit of information. For example, each memory cell in portion 111 can be operable to store at most one bit of information if the configuration mode set for portion 111 is configuration mode 121 (e.g., SLC mode). In another example, each memory cell in portion 111 can be operable to store more than one bit of information if the configuration mode set for portion 111 is either configuration mode 122 (e.g., MLC mode) or configuration mode 123 (e.g., TLC).

As shown in FIG. 1, each of portions 111, 112, and 113 can be associated with a unique identification (ID) (e.g., portion ID). The ID may be assigned by control unit 120. For example, control unit 120 may assign IDs 141, 142, and 143 to portions 111, 112, and 113, respectively. Control unit 120 can access portions 111, 112, and 113 to store information in or to retrieve information from portions 111, 112, and 113 based on their corresponding IDs 141, 142, and 143. IDs 141, 142, and 143 can also be used by (e.g., known by) other components (e.g., host 102) of apparatus 100 to access portions 111, 112, and 113.

As shown in FIG. 1, control unit 120 can receive (at interface 130) control information CTL provided by host 102. Control information CTL can be provided to memory device 101 during a set up process (e.g., during an initialization process for memory device 101) in apparatus 100. Based on control information CTL, control unit 120 can determine corresponding settings (e.g., values) for the number (quantity) of portions (e.g., 111, 112, and 113) of memory cells 110 to be created, the number (quantity) of memory cell units 110u to be included in each of the portions, the IDs associated with the portions, and the configuration modes (e.g., SLC, MLC, or TLC) to be set for the portions. Control unit 120 may store these settings in registers (not shown) in control unit 120.

As an example, memory device 101 may be configured to operate based on non-volatile memory express (NVMe) specification (developed by NVM Express Work Group in Wakefield, Mass., USA). In this example, each of portions 111, 112, and 113 can be created during creation of namespaces in accordance with NVMe specification, such that portions 111, 112, and 113 can include three corresponding namespaces. Each of the three namespaces can be associated with a unique namespace ID (NSID) in accordance with NVMe specification. Thus, IDs 141, 142, and 143 can include NSIDs associated with the namespaces included in portions 111, 112, and 113.

In addition to the creation of namespaces in the example above, control unit 120 may set a configuration mode for each of the namespaces included in portions 111, 112, and 113. For example, during creation of namespaces, control unit 120 may receive an indication (e.g., a command) from host 102 to set up a configuration mode for each of the namespaces included in portions 111, 112, and 113. In response to the indication, control unit 120 may cause the namespaces in portions 111, 112, and 113 to operate in different configuration modes. For example, control unit 120 may cause the namespace included in portion 111 to operate in SLC mode and cause the namespaces included in portions 112 and 113 to operate in MLC mode or TLC mode. The indication (to set up a configuration mode for each of the namespaces) provided from host 102 to control unit 120 may be included in control information CTL during creation of namespaces or may be separate from control information CTL during creation of namespaces.

As mentioned in an example above, portions 111, 112, and 113 can be created during creation of namespaces in accordance with NVMe specification, such that portions 111, 112, and 113 can include three corresponding namespaces in accordance with NVMe specification. Thus, memory device 101 can have different namespaces (included in portions 111, 112, and 113) that are concurrently configured (e.g., configured at the time the namespaces are created) to operate in different configuration modes (e.g., SLC and at least one of MLC and TLC modes).

A portion of control unit 120 (e.g., at least some or all of the operations of control unit 120 described above) can be implemented by software, firmware, hardware, or any combination of software, firmware, and hardware.

As shown in FIG. 1, host 102 can include a host controller 150 and an interface (e.g., host interface) 160. Host controller 150 can include a central processing unit (CPU). Host controller 150 can provide control information CTL to memory device 101 through interface 160 of host 102, connection 103, and interface 130 of memory device 101. Examples of connection 103 include conductive traces (e.g., a bus) on a circuit board (e.g., motherboard), a wire cable, or a combination of both. Each of interfaces 130 and 160 can include components (e.g., connectors and circuitry) that comply with Peripheral Component Interconnect Express (PCIe) specification, Serial Advanced Technology Attachment (SATA) specification, Serial Attached Small Computer System Interface (SAS) specification, or other specifications. Thus, each of interfaces 130 and 160 may include a connector having a form factor (e.g., physical dimension and conductive terminals) complying with PCIe, SATA, SAS, or other specifications.

Host controller 150 can be configured to communicate with an operating system (OS) 170 (or multiple operating systems) to exchange (e.g., send and receive) information between host 102 and memory device 101. As shown in FIG. 1, host 102 can operate with logical address ranges 171, 172, and 173, which can be included in an address space (e.g., address space of OS 170) recognized by host controller 150. FIG. 1 shows logical address ranges 171, 172, and 173 being associated with one host (e.g., host 102) and one operating system (e.g., OS 170) as an example. Apparatus 100, however, may include multiple hosts, multiple operating systems, or both, and logical address ranges 171, 172, and 173 may be associated with multiple hosts, multiple operating systems, or both multiple hosts and multiple operating systems.

Each of logical address ranges 171, 172, and 173 can be associated (e.g., by control unit 120) with a number of memory cells 110 that are allocated (e.g., formatted) to be accessed by host 102. For example, logical address ranges 171, 172, and 173 can be associated with portions 111, 112, and 113 of memory cells 110.

Each of logical address ranges 171, 172, and 173 can include logical block addresses (LBAs). Each LBA can be associated with a number of memory cells where information can be stored. For example, an LBA can be associated with one of memory cell units 110u. As an example, logical address range 171 may include LBA 0 through LBA X (where X is an integer), such that each of LBA 0 through LBA X can be associated with one of memory cell units 110u in portion 111. Thus, in this example, portion 111 may include at least X+1 memory units, which is based on LBAs corresponding to logical address range 171. Similarly, portion 112 may include a number of memory cell units 110u based on LBAs corresponding to logical address range 172. Portion 113 may include a number of memory cell units 110u based on LBAs corresponding to logical address range 173.

Host 102 can determine (e.g., can select) which configuration mode (e.g., SLC, MLC, or TLC mode) a portion of memory cells 110 associated with a particular logical address range (e.g., one of 171, 172, and 173) can operate in. For example, as described above, portions 111, 112, and 113 can be associated with logical address ranges 171, 172, and 173. In this example, host 102 can provide (e.g., send) an indication (e.g., a command) to memory device 101 to inform control unit 120 to set a particular configuration mode for each of portions 111, 112, and 113. Such an indication can be part of control information CTL or can be separate from control information CTL.

As an example, host 102 can provide an indication to inform control unit 120 to cause portion 111 to operate in configuration mode 121 (e.g., SLC mode), portion 112 to operate in configuration mode 122 (e.g., MCL mode), and portion 113 to operate in configuration mode 123 (e.g., TLC mode). In another example, host 102 can provide an indication to inform control unit 120 to cause portion 111 to operate in configuration mode 121 (e.g., SLC mode) and to cause both portions 112 and 113 to operate in either configuration mode 122 or configuration mode 123.

The indication (to set up a configuration mode for a particular portion of memory cells 110) provided by host 102, as described above, can be based on input information received by host 102 from an input device (not shown in FIG. 1) coupled to host 102 (or included in host 102). An example of the input device includes a keyboard, a pointing device (e.g., a mouse), a touchscreen display, or other types of input devices. A user of apparatus 100 may provide such input information, which can include at least one configuration mode (e.g., at least one of SLC, MLC, and TLC modes) selected by the user for a particular portion of memory cells 110. Alternatively, the input information (used to provide the indication to set up a configuration mode for a particular portion of memory cells 110) may be determined (e.g., automatically determined) by host 102, by memory device 101, or both, without input from a user. For example, host 102 may determine a configuration mode for a particular portion of memory cells 110 based on a condition (e.g., based on historical operation conditions) of apparatus 100 evaluated by host 102.

A configuration mode of a particular portion of memory cells 110 can remain unchanged after it is configured (e.g., set) or can be changed to a different configuration mode after it is configured. For example, after portion 111 is configured (e.g., by control unit 120) to operate in configuration mode 121, portion 111 can be configured (e.g., re-configured) to operate in a different configuration mode, such as configuration mode 122 or 123. A new control information can be provided to memory device 101 (e.g., from host 102) to cause a change in the configuration mode. For example, the new control information may include an indication that indicates a change in the configuration mode of portion 111 from a current configuration mode (e.g., 121) to a different configuration mode (e.g., 122 or 123). In response to the new control information, control unit 120 may change the values of the settings stored in registers (not shown) in control unit 120 to reflect the change in the configuration mode. The change in the configuration mode can be determined by a user. Alternatively, the change in the configuration mode can be determined (e.g., automatically determined) by host 102 (e.g., based on operating conditions of apparatus 100 evaluated by host 102).

In memory device 101, the capability to have different portions (e.g., different namespaces) in its memory cells concurrently configured to operate in different configuration modes (e.g., SLC mode, MLC mode, and TLC mode) may allow memory device 101 to be more suitable for some usage environments (e.g., steady state operations in some computing systems) than some conventional memory devices (e.g., some conventional SSDs). For example, memory cells (e.g., at least one of portions 111, 112, and 113) operating in SLC mode may have a greater speed, more endurance, or more reliability (or a combination of these properties) than memory cells operating in MCL mode or TLC mode. However, configuring a portion of memory cells 110 of memory device 101 to operate in SLC mode may decrease the overall storage density (e.g., storage size) of memory cells 110. Nevertheless, having the capability described above (e.g., having different portions of memory cells 110 configured to operate in different configuration modes) may allow memory device 101 to provide apparatus 100, the user of apparatus 100, or both, a flexibility in using memory device 101. For example, memory device 101 may give apparatus 100, the user of apparatus 100, or both the ability to balance performance (e.g., speed, endurance, and reliability) with storage density in memory device 101 based on usage environments.

Figure 2:
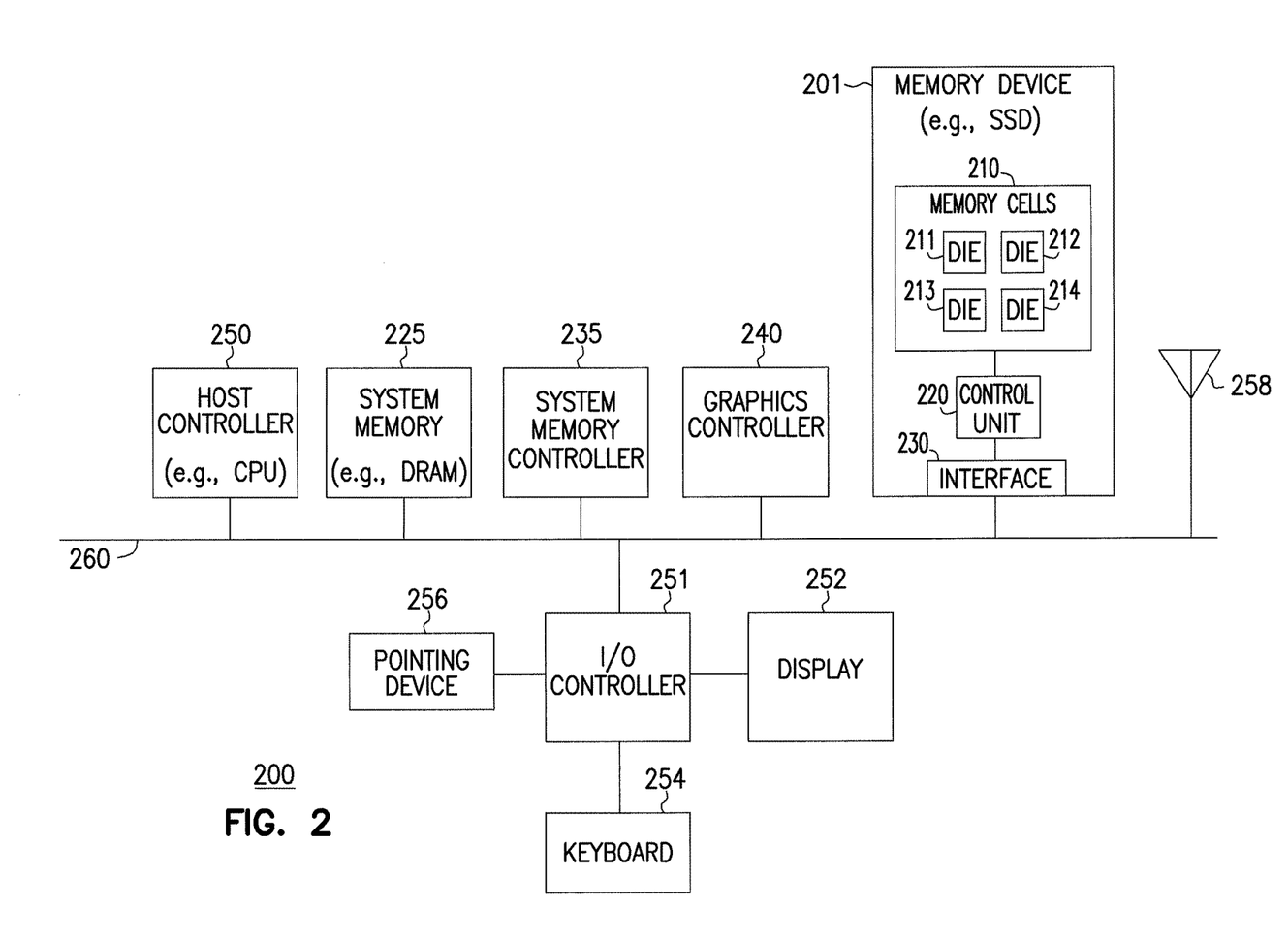
FIG. 2 is a block diagram of an apparatus in the form of a system (e.g., electronic system), according to some embodiments described herein.

FIG. 2 is a block diagram of an apparatus in the form of a system (e.g., electronic system) 200, according to some embodiments described herein. System 200 can include or be included in a computer, a memory storage system, or other types of electronic systems. As shown in FIG. 2, system 200 can include a memory device 201 (which can include an SSD), a host controller 250, a system memory 225, a system memory controller 235, a graphics controller 240, an input and output (I/O) controller 251, a display 252, a keyboard 254, a pointing device 256, at least one antenna 258, and a bus 260. Some of the components of system 200 (e.g., some of the components in FIG. 2, except memory device 201) can include or be included in a host, such as host 102 of FIG. 1.

As shown in FIG. 2, memory device 201 can include dice (e.g., semiconductor chips) 211, 212, 213, and 214 where memory cells 210 can be located. Memory device 201 can correspond to memory device 101 of FIG. 1. For example, memory cells 210 can correspond to memory cells 110 of FIG. 1, such that portions 111, 112, and 113 (FIG. 1) can be included in only one die among dice 211, 212, 213, and 214 or included in multiple dice among dice 211, 212, 213, and 214. FIG. 2 shows memory device 201 including four dice 211, 212, 213, and 214 as an example. The number of dice in memory device 201 may vary.

Memory device 201 can include a control unit 220 and an interface 230, which can correspond to control unit 120 and interface 130, respectively, of memory device 101 of FIG. 1. As shown in FIG. 2, control unit 220 can be included in a die (e.g., a controller chip) separated from dice (e.g., memory chips) 211, 212, 213, and 214. Memory device 201 can be configured to operate in ways similar to, or the same as, memory device 101 of FIG. 1.

Host controller 250 may include a central processing unit (CPU), which can be part of a general-purpose processor or part of an application specific integrated circuit (ASIC). Host controller 250 can correspond to host controller 150 of FIG. 1. Thus, host controller 250 can be configured to operate in ways similar to, or the same as, host controller 150 of FIG. 1.

System memory 225 may include a DRAM device, an SRAM device, a flash memory device, or a combination of these memory devices. I/O controller 251 can include a communication module for wired or wireless communication (e.g., communication through one or more antennas 258). Display 252 can include a liquid crystal display (LCD), a touchscreen (e.g., capacitive or resistive touchscreen), or another type of display. Pointing device 256 can include a mouse, a stylus, or another type of pointing device. At least one of the components (e.g., at least one of display 252, keyboard 254, and pointing device 256) of system 200 can be used as an input device (e.g., used by a user) to provide input information to host controller 250 (e.g., during creation of NVMe namespaces in memory device 201). Such input information may include the input information described above with reference to FIG. 1, such that host controller 250 may use the input information to provide control information (e.g., CTL) for determining a configuration mode (e.g., SLC mode, MLC mode, or TLC mode) for at least one of the memory portions in memory device 201.

FIG. 2 shows the components of system 200 arranged separated from each other as an example. In some arrangements, two or more components of system 200 can be located on the same die (e.g., same chip).

Figure 3:
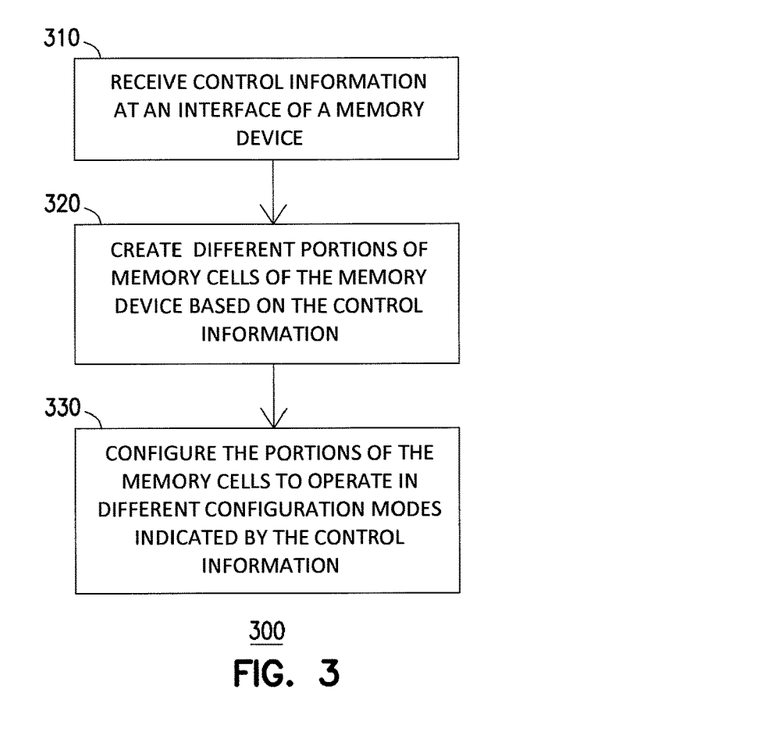
FIG. 3 is a flow diagram showing a method of determining a configuration mode in a memory device, according to some embodiments described herein.

FIG. 3 is a flow diagram showing a method 300 of determining a configuration mode in a memory device, according to some embodiments described herein. Method 300 can be performed by a memory device (memory device 101 or 201) described above with reference to FIG. 1 and FIG. 2. Some or all of the activities in method 300 can be implemented by software, firmware, hardware, or any combination of software, firmware, and hardware.

As shown in FIG. 3, method 300 can include activities 310, 320, and 330. Activity 310 can include receiving control information at an interface of a memory device (e.g., an SSD). The control information may be provided to the memory device by a host communicating with the memory device. The memory device in method 300 includes memory cells (e.g., non-volatile memory cells).

Activity 320 can include creating different portions of the memory cells based on the control information. For example, the portions of the memory cells can be created based on logical address ranges (e.g., LBA ranges) indicated by the control information. The control information may be received by the memory device (e.g., in activity 310) during creation of NVMe namespaces. Thus, the portions of the memory cells created in activity 320 can include namespaces in accordance with NVMe specification.

Activity 330 can include configuring the portions of the memory cells to operate in different configuration modes indicated by the control information. For example, activity 330 may include configuring a portion of the memory cells to operate in a configuration mode, such that each memory cell in the portion of the memory cells can be operable to store at most one bit of information. Activity 330 may include configuring an additional portion of the memory cells to operate in another configuration mode, such that each memory cell in the additional portion of the memory cells can be operable to store more than one bit of information.

Method 300 can include additional activities described above with reference to FIG. 1 and FIG. 2, such as activities and operations of apparatus 100 (including operations of memory device 101) and operations of system 200 (including operations of memory device 201).

Figure 4:
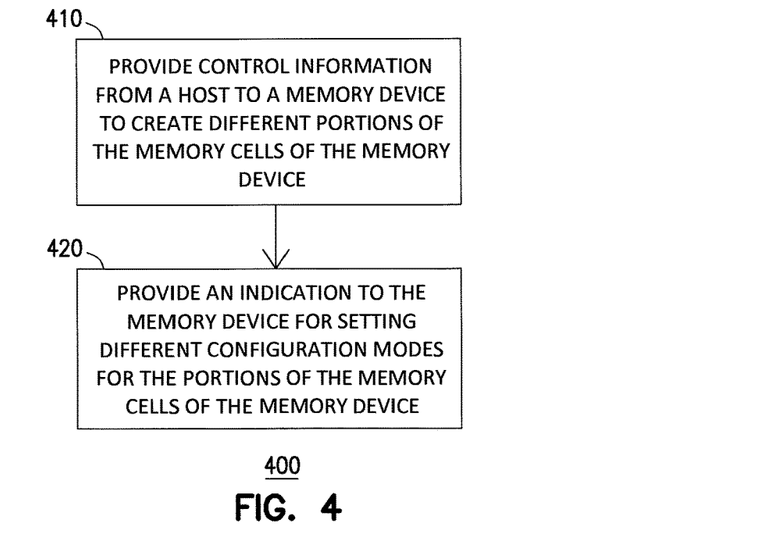
FIG. 4 is flow diagram showing another method of determining a configuration mode in a memory device, according to some embodiments described herein.

FIG. 4 is flow diagram showing a method 400 of determining a configuration mode in a memory device, according to some embodiments described herein. Method 400 can be performed by a host (host 102) or by a host controller (e.g., host controller 250) described above with reference to FIG. 1 and FIG. 2. Some or all of the activities in method 400 can be implemented by software, firmware, hardware, or any combination of software, firmware, and hardware.

As shown in FIG. 4, method 400 can include activities 410 and 420. Activity 410 can include providing control information from a host (e.g., a host controller) to a memory device (e.g., an SSD) to create different portions of the memory cells of the memory device. The memory cells can include non-volatile memory cells. The control information can include logical address ranges (e.g., LBA ranges). The logical address ranges can be used by the memory device to associate portions of the memory cells with the logical address ranges. Activity 420 can include providing an indication to the memory device for setting different configuration modes for the portions the memory cells. Depending on the configuration mode in a particular portion of the memory cells, each memory cell in the particular portion of the memory cells can be operable to store at most one bit of or more than one bit of information. Activity 420 can provide the indication to the memory device during creation of NVMe namespaces. The namespaces can be included in a corresponding portion of the memory cells of the memory device.

Method 400 can include additional activities described above with reference to FIG. 1 and FIG. 2, such as activities and operations of apparatus 100 (including operations of host 102) and operations of system 200 (including operations of host controller 250).

The illustrations of the apparatuses (e.g., apparatus 100 and system 200) and methods (e.g., methods 300 and 400 and operations performed by apparatus 100 and system 200) are intended to provide a general understanding of the structure of various embodiments and are not intended to provide a complete description of all the elements and features of an apparatus that might make use of the structures described herein.

The apparatuses (e.g., apparatus 100 and system 200) described above can include or be included in high-speed computers, communication and signal processing circuitry, single- or multi-processor modules, single or multiple embedded processors, multi-core processors, message information switches, and application-specific modules including multilayer, multi-chip modules. Such apparatuses may further be included as sub-components within a variety of other apparatuses (e.g., electronic systems), such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

The embodiments described above with reference to FIG. 1 through FIG. 4 include apparatuses and methods having an interface to communicate with a host, memory cells, and a control unit coupled to the interface to associate a portion of the memory cells with a logical address range based on control information provided to the interface from the host. The control unit is configured to cause the portion of the memory cells to operate in a configuration mode indicated by the control information from the host. Each memory cell in the portion of the memory cells is operable to store at most one bit of information if the configuration mode is a first configuration mode and to store more than one bit of information if the configuration mode is a second configuration mode. Other embodiments, including additional apparatuses and methods, are described.

The above description and the drawings illustrate some embodiments to enable those skilled in the art to practice the embodiments of the invention. Other embodiments may incorporate structural, logical, electrical, process, and other changes. Examples merely typify possible variations. Portions and features of some embodiments may be included in, or substituted for, those of other embodiments. Many other embodiments will be apparent to those of skill in the art upon reading and understanding the above description.

What is claimed is:

1. An apparatus comprising:
an interface located at a memory device to communicate with a host, the memory device being located outside the host;
memory cells; and
a control unit coupled to the interface to associate a first portion of the memory cells with a logical address range based on control information provided to the interface from the host, the control information including a configuration mode for the first portion of the memory cells and an additional configuration mode for a second portion of the memory cells, the control information including a first setting for a number of memory cell units among the memory cells to be included in the first portion of the memory cells and a second setting for a number of memory cell units among the memory cells to be included in the second portion of the memory cells, based on the control information, the control unit is configured to determine corresponding settings for the number of memory cells to be included in each of the first and second portions of the memory cells, identifications associated with the first and second portions of the memory cells, and the configuration mode to be set for each of the first and second portions of the memory cells, and the control unit is configured to store the corresponding settings in registers of the memory device, the control unit configured to cause the first portion of the memory cells to operate in the configuration mode for the first portion of the memory cells indicated by the control information from the host, each memory cell in the first portion of the memory cells operable to store at most one bit of information if the configuration mode for the first portion of the memory cells indicated by the control information from the host is a first configuration mode and to store more than one bit of information if the configuration mode for the first portion of the memory cells indicated by the control information from the host is a second configuration mode, wherein
the logical address range is a first logical address range, and the control unit is configured to associate the second portion of the memory cells with a second logical address range based on the control information from the host,
the control unit is further configured to cause the second portion of the memory cells to operate in the additional configuration mode indicated by the control information from the host, and the additional configuration mode is different from the configuration mode for the first portion of the memory cells, and
each memory cell in the second portion of the memory cells operable to store at most one bit of information if the additional configuration mode for the second portion of the memory cells indicated by the control information from the host is the first configuration mode and to store more than one bit of information if the additional configuration mode for the second portion of the memory cells indicated by the control information from the host is the second configuration mode.

2. The apparatus of claim 1, wherein the control unit is configured to associate a third portion of the memory cells with a third logical address range based on the control information, the control unit further configured to cause the third portion of the memory cells to operate in a configuration mode different from the configuration mode for each of the first and second portions of the memory cells, each memory cell in the third portion of the memory cells operable to store more than two bits of information.

3. The apparatus of claim 1 wherein the control information is provided to the interface during creation of a namespace in accordance with non-volatile memory express (NVMe) specification.

4. The apparatus of claim 1, wherein the logical address range includes logical block addresses determined by the host.

5. The apparatus of claim 1 wherein the logical address range is included in an address space recognized by an operating system associated with the host.

6. The apparatus of claim 1, wherein the interface, the memory cells, and the control unit are included in a solid state drive (SSD).

7. The apparatus of claim 1, wherein the interface includes a connector having a form factor complying with Peripheral Component Interconnect Express (PCIe) specification.

8. The apparatus of claim 1, wherein the interface includes a connector having a form factor complying with Serial Advanced Technology Attachment (SATA) specification.

9. The apparatus of claim 1, wherein the interface includes a connector having a form factor complying with Serial Attached Small Computer System Interface (SAS) specification.

10. An apparatus comprising:
memory cells; and
a control unit to associate a portion of the memory cells with a namespace during creation of the namespace in accordance with non-volatile memory express (NVMe) specification, the control unit configured to cause the portion of the memory cells to operate in a configuration mode indicated by control information provided from a host to the control unit during the creation of the namespace, each memory cell in the portion of the memory cells operable to store at most one bit of information if the configuration mode indicated by control information provided from the host is a first configuration mode, to store at most two bits of information if the configuration mode indicated by control information provided from the host is a second configuration mode, and to store more than two bits of information if the configuration mode indicated by control information provided from the host is a third configuration mode, wherein
the portion of the memory cells is a first portion of the memory cells and the namespace is a first namespace, and the control unit is configured to associate a second portion of the memory cells with a second namespace, the control unit further configured to cause the second portion of the memory cells to operate in an additional configuration mode indicated by the control information, the additional configuration mode for the second portion of the memory cells indicated by control information provided from the host being different from the configuration mode for first portion of the memory cells indicated by control information provided from the host, and the control information including a first setting for a number of memory cell units among the memory cells to be included in the first portion of the memory cells and a second setting for a number of memory cell units among the memory cells to be included in the second portion of the memory cells, based on the control information, the control unit is configured to determine corresponding settings for the number of memory cells to be included in each of the first and second portions of the memory cells, identifications associated with the first and second portions of the memory cells, and the configuration mode to be set for each of the first and second portions of the memory cells, and the control unit is configured to store the corresponding settings in registers of the memory device, and each memory cell in the second portion of the memory cells operable to store at most one bit of information if the additional configuration mode for the second portion of the memory cells indicated by control information provided from the host is the first configuration mode, to store at most two bits of information if the additional configuration mode for the second portion of the memory cells indicated by control information provided from the host is the second configuration mode, and to store more than two bits of information if the configuration mode for the second portion of the memory cells indicated by control information provided from the host is the third configuration mode.

11. The apparatus of claim 10, wherein the control unit is included in a die and the memory cells are included in at least one additional die.

12. The apparatus of claim 10, wherein the memory cells are included in a single die.

13. The apparatus of claim 10, memory cells are included in multiple dice.

14. The apparatus of claim 10, wherein the memory cells and the control unit are included in a solid state drive (SSD).

15. The apparatus of claim 10, wherein the control information provided by the host to the control unit is based on information from an input device communicating with the host.

16. The apparatus of claim 15, wherein the input device includes a keyboard.

17. The apparatus of claim 10, wherein the host includes a central processing unit (CPU).

18. An apparatus comprising:
a host interface located at a host to communicate with a memory device, the memory device located outside the host; and
a host controller located at the host to communicate with the memory device through the host interface, the host controller configured to provide control information to the memory device, and to cause the memory device to associate a first portion of memory cells in the memory device with a first logical address range based on the control information and associate a second portion of memory cells in the memory device with a second logical address range based on the control information, the host controller to provide an indication informing the memory device to cause each memory cell in the first portion of the memory cells to be operable to store at most one bit of information based on the indication from the host controller and each memory cell in the second portion of the memory cells to be operable to store more than one bit of information based on the indication from the host controller, and the control information including a first setting for a number of memory cell units among memory cells of the memory device to be included in the first portion of memory cells and a second setting for a number of memory cell units among memory cells of the memory device to be included in the second portion of the memory cells, based on the control information, a control unit of the memory device is configured to determine corresponding settings for the number of memory cells to be included in each of the first and second portions of the memory cells, identifications associated with the first and second portions of the memory cells, and a configuration mode to be set for each of the first and second portions of the memory cells, and the control unit is configured to store the corresponding settings in registers of the memory device.

19. The apparatus of claim 18, wherein the host controller includes a central processing unit (CPU) and the first and second logical address ranges are included in an address space recognized by the CPU.

20. The apparatus of claim 18, wherein the host controller is configured to provide the control information to the memory device during creation of a first namespace and a second namespace in accordance with non-volatile memory express (NVMe) specification, such that the first namespace is included in the first portion of the memory cells, and the second namespace is included in the second portion of the memory cells.

21. The apparatus of claim 18, wherein the host interface complies with one of Peripheral Component Interconnect Express (PCIe) specification, Serial Advanced Technology Attachment (SATA) specification, and Serial Attached Small Computer System Interface (SAS) specification.

22. An apparatus comprising:
a host controller; and
a solid state drive (SSD) including non-volatile memory cells, the SSD configured to create portions of the memory cells based on control information provided to the SSD from the host controller during creation of the portions of the memory cells and cause the portions of the memory cells to operate in different configuration modes based on the control information provided to the SSD from the host controller during creation of the portions of the memory cells, the configuration modes including a configuration mode for a first portion of the memory cells and an additional configuration mode for a second portion of the memory cells, wherein the first configuration mode based on the control information provided to the SSD from the host controller causes each memory cell in the first portion of the memory cells to be operable to store at most one bit of information, the second configuration mode based on the control information provided to the SSD from the host controller causes each memory cell in the second portion of the memory cells to be operable to store more than one bit of information, and the control information provided to the SSD from the host controller including a first setting for a number of memory cell units among the memory cells to be included in the first portion of the memory cells and a second setting for a number of memory cell units among the memory cells to be included in the second portion of the memory cells, based on the control information, a control unit of the SSD is configured to determine corresponding settings for the number of memory cells to be included in each of the first and second portions of the memory cells, identifications associated with the first and second portions of the memory cells, and the configuration mode to be set for each of the first and second portions of the memory cells, and the control unit is configured to store the corresponding settings in registers of the SSD.

23. The apparatus of claim 22, further comprising an input device coupled to the host controller, wherein the control information provided to the SSD from the host controller is based on input information from the input device.

24. The apparatus of claim 23, wherein the input information from the input device is provided by a user during the creation of the portions of the memory cells.

25. The apparatus of claim 23, wherein the input information from the input device is provided by a user through the input device, and the input device includes at least one of a keyboard, a pointing device, and a touchscreen display.

26. A method comprising:
  receiving control information at an interface of a solid state drive (SSD), the control information provided by a host, the SSD including memory cells, the control information including a first configuration mode for a first portion of the memory cells and a second configuration mode for a second portion of the memory cells, and the control information including a first setting for a number of memory cell units among the memory cells to be included in the first portion of the memory cells and a second setting for a number of memory cell units among the memory cells to be included in the second portion of the memory cells;
  determining, based on the control information, corresponding settings for the number of memory cells to be included in each of the first and second portions of the memory cells, identifications associated with the first and second portions of the memory cells, and the first and second configuration modes, and storing the corresponding settings in registers of the SSD;
  creating the first portion of the memory cells and the second portion of the memory cells based on the control information provided to the SSD from the host;
  configuring the first portion of the memory cells to operate in the first configuration mode based on the control information provided to the SSD from the host, such that each memory cell in the first portion of the memory cells is operable to store at most one bit of information; and
  configuring the second portion of the memory cells to operate in the second configuration mode based on the control information provided to the SSD from the host, such that each memory cell in the second portion of the memory cells is operable to store more than one bit of information.

27. The method of claim 26, wherein the control information is received at a connector of the SSD, the connector having a form factor complying with one of Peripheral Component Interconnect Express (PCIe) specification, Serial Advanced Technology Attachment (SATA) specification, and Serial Attached Small Computer System Interface (SAS) specification.

28. The method of claim 26, further comprising:
  providing the control information from the host to the SSD during creation of a first namespace and a second namespace in accordance with non-volatile memory express (NVMe) specification, wherein the first portion of the memory cells includes the first namespace, and the second portion of the memory cells includes the second namespace.

* * * * *